United States Patent [19]

Andrews et al.

[11] Patent Number: 5,029,147
[45] Date of Patent: Jul. 2, 1991

[54] ACOUSTIC, UNDERWATER, TELEMETRY SYSTEM

[75] Inventors: Guy J. Andrews, La Verne; John M. McCool, Altadena; Shelby F. Sullivan, Arcadia, all of Calif.

[73] Assignee: The United States of America as represented by the Secretary of the Navy, Washington, D.C.

[21] Appl. No.: 803,522

[22] Filed: Feb. 26, 1969

[51] Int. Cl.$^5$ ............................................. H04B 11/00
[52] U.S. Cl. .................................................. 367/134
[58] Field of Search ........................ 325/28, 29, 40, 45, 325/47, 145, 344; 178/66, 67, 66.1, 67.1; 340/5; 367/134; 375/6; 455/40

[56] References Cited

U.S. PATENT DOCUMENTS 3,305,636  2/1967  Webb ........................................ 375/1

Primary Examiner—Daniel T. Pihulic
Attorney, Agent, or Firm—Harvey Fendelman; Thomas Glenn Keough; John Stan

[57] ABSTRACT

An acoustic, underwater, telemetry system between two vehicles, a free-running, deep-operating, sonar platform, or Sonaray vehicle, to overcome refraction, and a surface ship to provide processing of the sonar data gathered by the Sonaray vehicle. The telemetry system is required to communicate analog sonar information, digital command to control the platform, and digital information concerning the status of the platform, between the Sonaray vehicle and the surface ship. The Sonaray concept requires more than 32 channels of analog information for sonar data transmission, each corresponding to a particular received azimuthal beam and each having an information bandwidth of 1 kHz. The output of the analog channels consists of raw data from the search sonar. Because of the long range and very high reliability of the transmission required for the status and control channels, sonar processing by cross-correlation is used to search in both range and doppler. Because the arrival time of the telemetered signal at the surface ship differs from the time of transmission from the Sonaray vehicle, a time-determining code is telemetered simultaneously with the analog information from the Sonaray vehicle. A frequency-diversity encoding scheme overcomes the problem of absorption of acoustic energy in seawater by allowing separate signal normalization in each frequency band. A phase-lock loop overcomes the effects of the large doppler shift which normally occurs. Two maximal length shift-register sequences, often called p-n sequences, are used with phase modulation for the digital information.

19 Claims, 8 Drawing Sheets

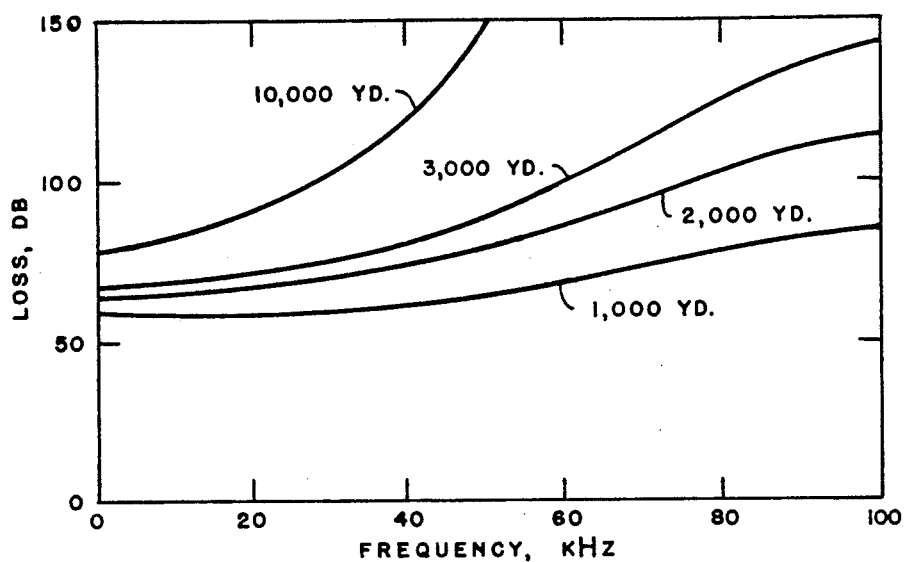
FIG. 2.
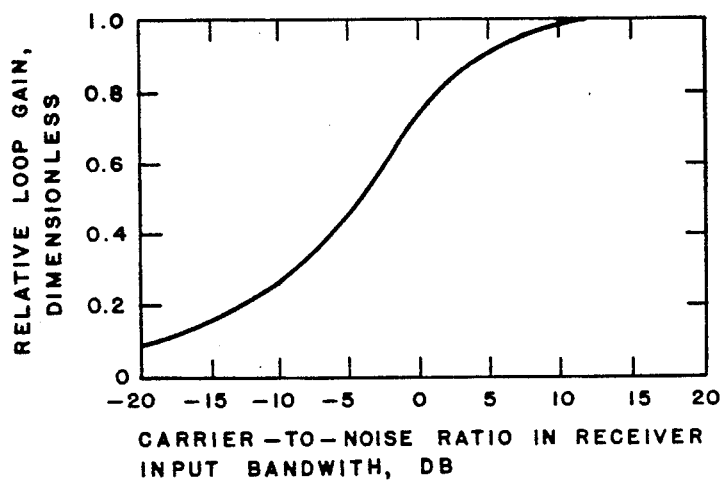
FIG. 3.
FIG. 4.
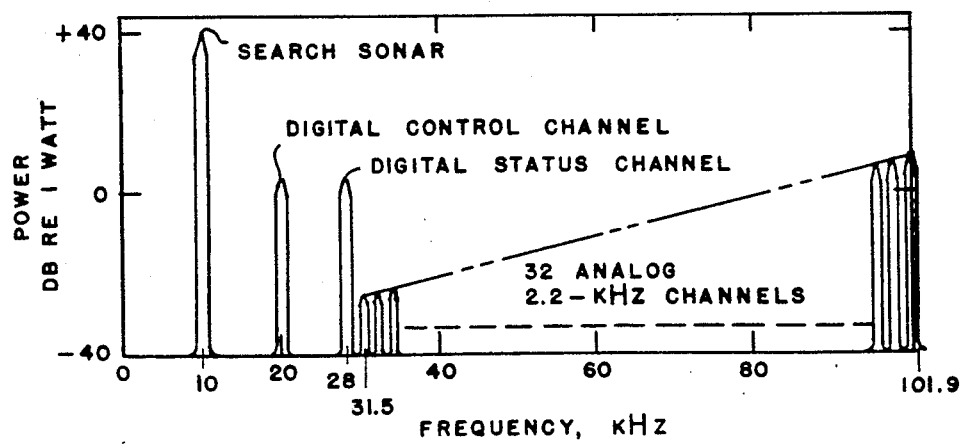

ACOUSTIC, UNDERWATER, TELEMETRY SYSTEM

The invention described herein may be manufactured and used by or for the Government of the United States of America for governmental purposes without the payment of any royalties thereon or therefor.

In the prior art, only systems with relatively narrow bandwidth have been used, transmitting information in a band of 1 kHz, more or less. Narrow band systems using FM modulation or single sideband modulation have been used with underwater hydrophone systems. However, in none of the prior art up to now has there been any system with the relatively broad bandwidth or versatility of the invention described herein.

The general purpose of this invention is to provide a telemetry system which embraces all the advantages of similarly employed prior art telemetry systems and possesses none of the aforedescribed disadvantages. To attain this, the present invention contemplates a unique telemetry system comprising digital and analog channels and using cross-correlation detection and self-correction for doppler.

This invention relates to an acoustic underwater telemetry system which has been designed to satisfy the requirements of what is herein called the Sonaray system. This system is intended to protect convoys from submarine attack by providing reliable detection, classification, and fire-control solution of submarine targets to a range of 12 kiloyards (kyd). The Sonaray system requires two vehicles: a free-running, deep-operating sonar platform, termed a Sonaray vehicle, to overcome refraction; and a surface ship to provide processing of sonar data and to tie the system into the convoy screen. To communicate analog sonar information and digital command and status information between the sonar platform and the surface ship, a telemetry system is required.

All transducers on the Sonaray vehicle are assumed to have a 9-db directivity factor, which corresponds to a 90-degree cone. The transducer on the surface ship has a 10-inch aperture.

The Sonaray concept actually requires more than 32 channels of analog information for sonar data transmission, although in the description which follows, it will be assumed that there are exactly 32. Each channel corresponds to a particular received azimuthal beam and each has a maximum information bandwidth of about 1 kHz, thereby providing 40 kHz bandwidth of analog data. These channels operate without serious degradation to a horizontal range of 2 kyd and to a depth of 6,000 feet, with a minimum signal-to-noise ratio of 10 db at ranges out to 2.8 kyd.

The signal-to-noise and harmonic distortion requirements of the telemetry system are influenced by the type of signal processing used on the surface ship on the output of the analog channels, which consists of raw data from the search sonar. Sonar processing by cross-correlation is used to search in both range and doppler.

The telemetry receiver is implemented as a correlation detection system because it must operate with both forward-scattering and multipath propagation as interfering "noise" signals. The signal-to-noise ratio with each of these interfering signals is independent of the power of the transmitted signal. Therefore, the only possible way to get a signal-to-noise ratio enhancement is with a coherent detection process such as that provided with a correlation detector.

Doppler search requires that harmonic distortion introduced by the telemetry be less than 10%; otherwise, false targets will appear at harmonically related doppler frequencies.

Control of the Sonaray vehicle requires two channels of information, an upward link for determining the status of the vehicle and a downward link for controlling the vehicle. Both channels are digital and have a minimum rate of 30 bits per second, with a maximum error probability of $10^{-3}$. The two digital channels operate to a 6,000-foot depth and to a 10 kyd range, so that the vehicle may be controlled even when it is beyond the range at which the sonar information is usable. The maximum operating range is determined primarily by acoustic refraction. All specifications are for operation in conditions up to Sea State 6.

The purpose of the digital data channels are threefold; (1) they transmit command and status information between the surface ship and the Sonaray vehicle, at a rate of 30 bits per second; (2) they transmit, simultaneously with the analog data, a digital time-base reference to be used by the sonar signal processing equipment to interpret the analog data; and (3) they provide doppler correction for the analog data channel receiver.

The digital channels require a very high output signal-to-noise ratio, because an error in control or status of the Sonaray vehicle could confuse all sonar information and even lead to loss of contact with the Sonaray vehicle.

Another requirement of the system is determination of the arrival time of all sonar signals received at the Sonaray vehicle. Arrival time of the telemetered signal at the surface ship differs from the time of transmission from the Sonaray vehicle by the range between the surface ship and the Sonaray vehicle divided by the velocity of sound. To allow compensation for this difference, a time-determining code is telemetered simultaneously with the analog data from the Sonaray vehicle.

The following considerations were kept in mind when choosing the particular codes used with the telemetry system. An estimate was made of the doppler range in the system. How the code correlates with respect to changes in doppler was not an important factor because the doppler is known. The pseudo-noise (p-n) sequences used in the telemetry system form a good system. It is not obvious that an optimal system may be obtained by determining the doppler effect by a phase-lock loop on the carrier and the time delay by a code which is encoded upon the same carrier. P-n sequences form a very desirable code for this type of system.

The absorption of acoustic energy in sea water is a function of both frequency and range; thus, if the gain of a wide-band system is equalized for one range, it will not be equalized for any other range. Because this property almost precludes the use of a time-diversity encoding scheme, a frequency-diversity scheme is used. This allows separate signal normalization in each frequency band.

Another problem presented by acoustic telemetry is the large doppler shift which normally occurs. For the purpose of this invention, doppler is defined as the derivative of range between the surface ship and the Sonaray vehicle. Doppler rate is defined as the relative radial acceleration of the two vehicles. In this system, a maximum doppler of ±40 knots between the Sonaray vehicle and the surface ship can occur. This determines the receiver input bandwidth necessary for the telemetry system. The maximum doppler rate is ±10 knots per second.

Basically, doppler causes an effective time compression or expansion of the signal so that it causes a frequency shift proportional to the velocity of the vehicle. The signal is encoded onto the channel and the information of the signal determines how much bandwidth is required to transmit the signal, but, to receive the signal, a larger bandwidth is required to include the additional frequency shift due to doppler effects.

Another important advantage of the telemetry system of this invention is that it can be considered "detection-proof," for the following reason. At the ranges within which the telemetry system is to be used, there is very considerable attenuation at the sonar frequencies to be used. An enemy sonar detector at a distance significantly greater than the operating range of the telemetry system will not have a useful sonar signal to detect, the signal having been attenuated to a negligible value, inasmuch as the acoustic energy is rapidly absorbed with distance. Of course the enemy vehicle might hear the 10 kHz sonar search signal, but if it were any appreciable distance away from the Sonaray vehicle, it could not intercept the telemetry signal between the Sonaray vehicle and the surface ship, inasmuch as they are low-level signals which are readily absorbed by the water.

Long range and a very high reliability of data transmission are required for the digital status and control channels. In order to satisfy these requirements, cross-correlation is used for the transmitted codes. Maximal length shift-register sequences, often called pseudo-noise (p-n) sequences, are used because of their ease of generation and their excellent cross-correlation properties where a doppler correction has been made. In this case, it is possible to correct for doppler because it is measured by a phase-locked loop.

Two shift-register sequences are used, a longer one of 0.512 sec. for determinating time to 16 seconds, and a shorter one of 0.064 sec. for transmitting digital data. The time code and the digital data for Sonaray vehicle control are modulated onto the same carrier. Since there is no majority logic defined on an even number of binary inputs, it is convenient to use three approximately orthogonal inputs; the long p-n sequence and two different delays of the short sequence were chosen. The shorter sequence encodes two parallel inputs of digital data, thereby permitting encoding twice the number of bits in a given time duration, and permitting use of a majority logic circuit.

When digital status information is to be processed, the p-n codes as well as the clock pulses for these codes originate on the Sonaray vehicle.

The properties of these p-n codes are particularly good for multipath situations. If the path difference between the two paths is greater than 2.5 feet, then the correlation coefficient of the signal will be reduced according to the relation:

$$\frac{\mu_{ss}(0) + A\mu_{ss}(t_1)}{\sqrt{(1 + A^2)\mu_{ss}^2(0) + 2A\mu_{ss}(t_1)\mu_{ss}(0)}}$$

The term $\mu_{ss}(t)$ is the covariance function of the transmitted code and A is the relative amplitude of the multipath signals. For the long p-n sequence of 511 bits, this relationship is $$\frac{1 - 2(10^{-3})A}{\sqrt{1 + A^2 - 4(10^{-3})A}}$$

For the short sequence of 63 bits, it is $$\frac{1 - 3(10^{-2})A}{\sqrt{1 + A^2 - 6(10^{-2})A}}$$

A multipath signal whose power is equal to that of the direct path will result in a correlation-coefficient degradation of approximately 3 db.

Discussing now the objects of the invention, an object of the present invention is the provision of a telemetry system having an overall bandwidth much broader than that used in the prior art.

Another object is to provide a telemetry system incorporating both analog and digital channels.

A further object of the invention is the provision of a telemetry system which automatically corrects for doppler effects, even relatively high doppler shifts, between the transmitter station and the receiver station.

Yet another object of the present invention is the provision of a telemetry system which is detection-proof beyond the normal operating range.

A still further object of the present invention is the provision of a telemetry system which is capable of compensating for variation of attenuation with frequency.

Finally, another object of the invention is the provision of a telemetry system which is effective even when the signal is received by multiple paths.

Other objects and many of the attendant advantages of this invention will be readily appreciated as it becomes better understood by reference to the description and accompanying drawings which follow and wherein:

FIG. 2 is a graph showing acoustic loss as a function of frequency for various ranges.

FIG. 3 is a graph showing the relative phase-lock loop gain as a function of carrier-to-noise ratio in the receiver.

FIG. 4 is a graph showing the frequency allocation for the search sonar, digital and analog channels used in the telemetry system.

Figure 1A:
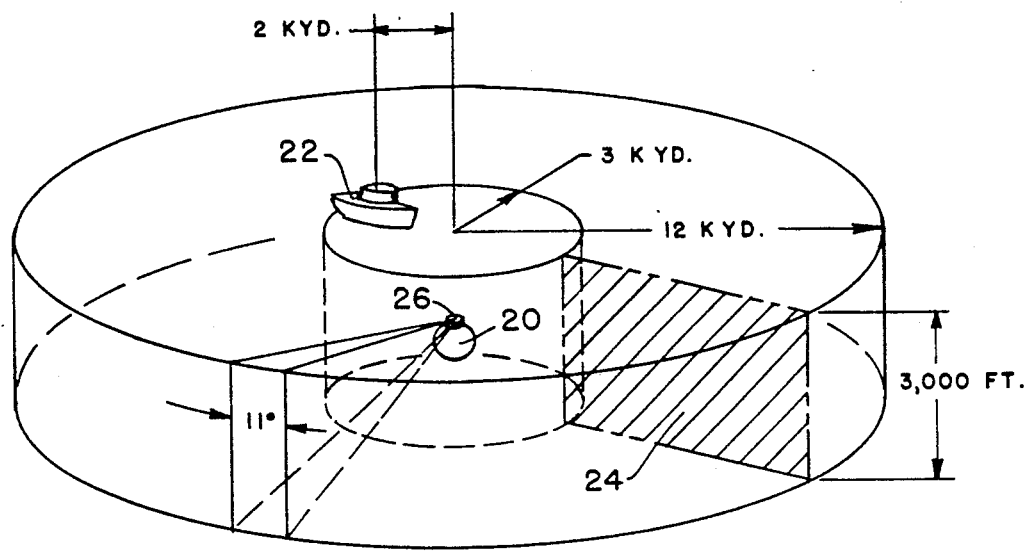
FIGS. 1A and 1B are pictorial representation of the two vehicles involved in the telemetry system of this invention and the approximate useful operating parameters for each.
Figure 1B:
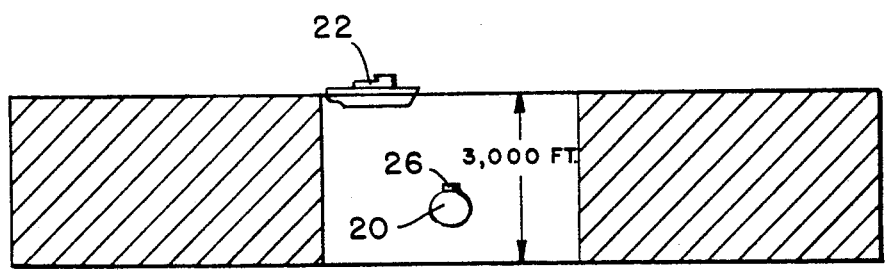

Referring now in more detail to the figures, and first to FIG. 1(A), the Sonaray vehicle 20 has a capability for detecting objects within the toroidal-shaped volume 22 whose center line goes through the center of the Sonaray vehicle, and whose cross section is shown by reference numeral 24. The volume immediately surrounding the Sonaray vehicle 20 having a radius of 3 kiloyards (kyd) is monitored by the surface ship 22, which controls the Sonaray vehicle 20. As shown in this figure, the Sonaray's detection capabilities extend to 12 kyd, with a vertical detection range of 3,000 feet.

The range of the surface ship or vessel 22 for the full data acquisition range is within an annulus of 2 kyd of the Sonaray vehicle 20. The surface ship 22 may control the Sonaray vehicle 20 at a distance greater than 2 kyd, but data acquisition from the Sonaray vehicle is not reliable or feasible at distances greater than 2 kyd. Thus, the status and control signals are operable over a longer range than the sonar data signals.

Although the search sonar system itself is not to be considered a part of this invention, a few general remarks about it in a typical system should facilitate understanding the telemetry system. A sonar signal at 10 kHz (refer to FIG. 4) is sent omnidirectionally from the Sonaray vehicle 20. The reflected signal is received by 32 beam transducers, shown diagrammatically in FIG. 1(A) by the vertical sections 26 on the Sonaray vehicle 20. The received sonar signal at 10 kHz is then transformed into 32 different frequencies, one frequency for each beam. The telemetry system concerns itself with the processing of each of these 32 beam frequencies.

While the sonar search signal is transmitted in all directions, a reflected sonar signal does not necessarily appear at each of the 32 beams, inasmuch as, in all probability, some of the 32 sectors scanned will not have a target signal reflected back to it. Information concerning both the presence of a reflected signal and the absence of the reflected signal is transmitted back to the surface ship 22. The telemetry system on the Sonaray vehicle 20 does not discriminate between these two types of signals, that is, it makes no determination as to whether the sonar signal is meaningful or not. These 32 signals are each modulated upon separate carrier frequencies, and the modulated carrier frequencies are sent simultaneously to the surface ship 22 at different predetermined frequencies.

With respect to transmitted digital information, the sonar signal is sent from the Sonaray vehicle 20 to the surface ship 22 as a phase-modulated analog signal. On the surface ship 22 the analog signal is transformed into digital information and stored and circulated in a time compressor, making the processing system a sampled-data processing system. The digital information stored in the time compressor is subsequently decoded.

The transmit power requirements may be determined from the processing gain of the system and from the various acoustic losses that are expected. The results of these considerations for Sonaray requirements for both digital channels and two typical analog channels are presented in Table 1.

TABLE 1

| Telemetry Power Requirements | | |
| --- | --- | --- |
| Carrier frequency, kHz | Slant range, yd × 1,000 | Total power in water, db relative to 1 watt |
| 20 (digital control) | 12 | −5 |
| 28 (digital status) | 10 | 5 |
| 30 (analog) | 2.7 | −27 |

TABLE 1-continued

| Telemetry Power Requirements | | |
| --- | --- | --- |
| Carrier frequency, kHz | Slant range, yd × 1,000 | Total power in water, db relative to 1 watt |
| 60 (analog) | 2.7 | −11 |

These calculations are based on a requirement of less than 0.1-percent error rate for the digital channels and 10-db output signal-to-noise ratio for the analog channels in Sea State 6.

The input signal-to-noise requirements of various parts of the telemetry system are different, so that the system's capabilities are degraded progressively as signal-to-noise ratio decreases. The input signal-to-noise requirements are summarized in Table 2.

TABLE 2

| Input Signal-to-Noise Requirements | |
| --- | --- |
| Subsystem | Signal-to-noise requirement, db |
| Analog channel | +10 |
| Digital channel | 0 |
| Digital time base | −24 |
| Master phase-lock loop | −27 |

One of the major reasons that phase modulation was selected is that it makes gain control easy, the gain of a phase-modulation channel being independent of signal level at a high signal-to-noise ratio, and this is the situation in which analog information is used.

Doppler correction for a phase-modulation system is very simple. The phase-locked loop can be used to lock onto the carrier, which reduces the problem to one of time expansion and time contraction of the modulation. This is a second-order effect that can be corrected by using the doppler output of the phase-locked loop.

The only critical filters are the low-pass types associated with the phase-locked loops. These can all be identical, and no critical filters at carrier frequency are used. To prevent the wastage of bandwidth, the digital channel corrects all other channels for doppler.

Use of a phase-lock loop solves the problem introduced by the large bandwidth requirement due to doppler. The problem is illustrated by noting that the receiver input bandwidth would be approximately 1.8 kHz for a 30-kHz channel in order to allow for maximum doppler where the information bandwidth is only 1 kHz; a receiver input bandwidth of 2.6 kHz would be required at 60 kHz, and so on. The phase-lock loop is used to transform the carrier to zero frequency independent of doppler modification of the carrier frequency, and so prevent bandwidth expansion. This simplifies the application of coherent detection methods to the signal.

The phase-lock loop has a loop bandwidth that determines the doppler rate that may be followed. This bandwidth was selected to be as narrow as possible and still allow tracking of maximum relative acceleration between the surface vessel and the Sonaray vehicle. For practical purposes, a maximum relative acceleration of 0.5 g is assumed. This allows a loop bandwidth of approximately 5 Hz for a 30-kHz carrier. Loop bandwidth is the most basic limitation of the telemetry system, because a carrier-to-noise ratio of at least 3 db in this bandwidth must be maintained in order to keep the loop in lock. This condition is met even when the signal-to-noise ratio of the information bandwidth becomes so low that it precludes the transmission of useful data.

FIG. 3 shows the relationship between the phase-locked loop gain and the carrier-to-noise ratio in the search bandwidth of the phase-locked loop. The loop gain of a phase-locked loop is approximately a linear function of the carrier-to-noise ratio within the search bandwidth. The high ratio of receiver input bandwidth to loop bandwidth in this system indicates that the loop may be required to operate over a wide range of carrier-to-noise ratio.

FIG. 4 illustrates the frequency allocation for the entire sonar system, including the search sonar frequency, which as has been explained hereinabove, is not actually a part of the telemetry system. In a specific embodiment of the sonar telemetry system, the digital "down", or control, channel is located in the 20 kHz region. The digital "up", or status, channel is located at 28 kHz and the analog data channels consist of 32 individual 2 kHz analog channels, separated at intervals of 2.2 kHz, from 31.5 to 101.9 kHz.

Figure 5:
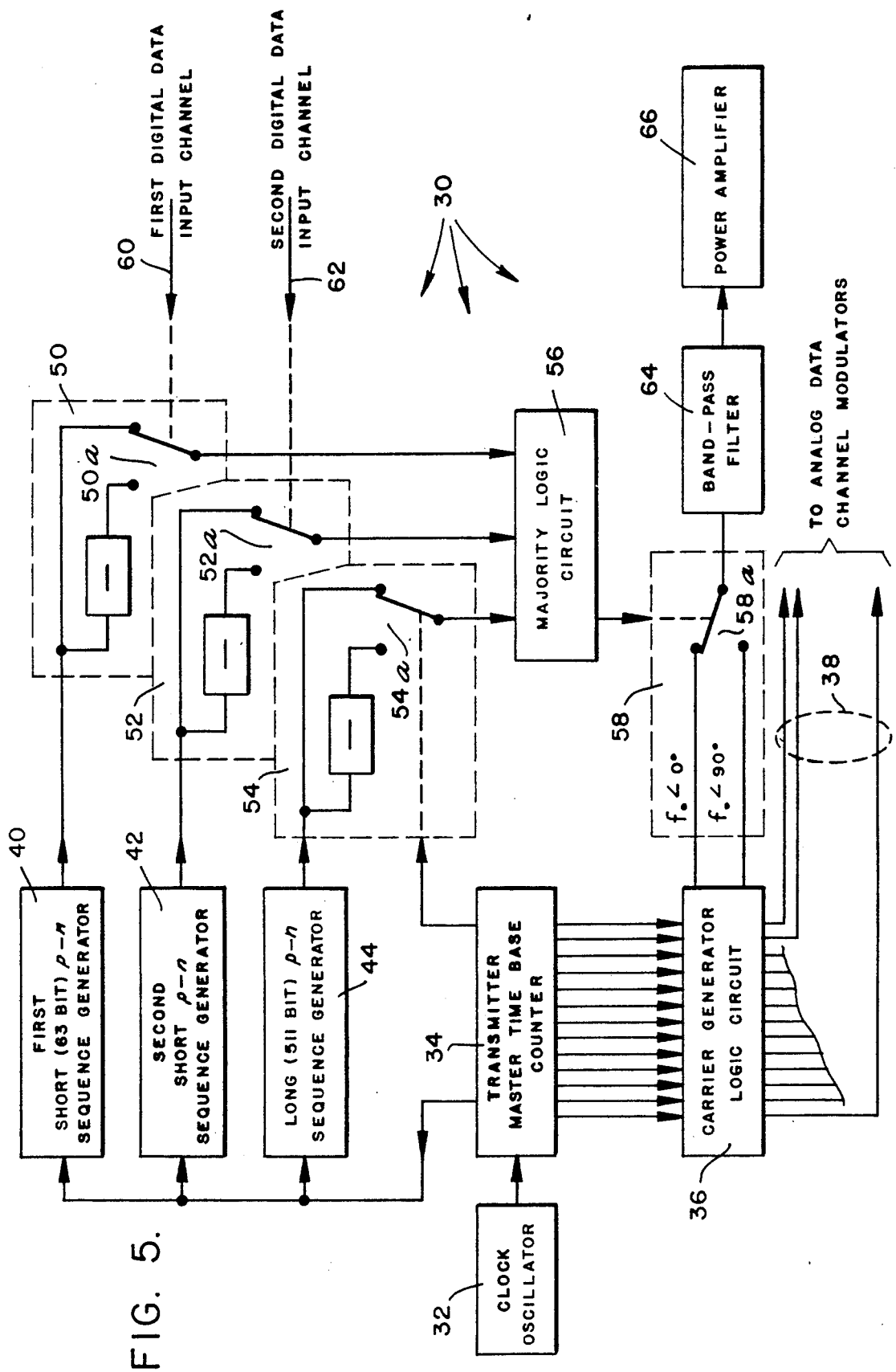
FIG. 5 is a simplified, conceptual, block diagram of the telemetry transmitter.

A conceptual type of block diagram for the telemetry transmitter 30 of the acoustic telemetry system is shown in FIG. 5. A crystal-controlled clock oscillator 32, operating at 1 mHz in an embodiment actually built, generates the fundamental square wave frequency from which all other frequencies are derived. Primary control of the telemetry transmitter is a 16-second maximum period binary transmitter master time base counter 34, whose shift rate is controlled by the clock oscillator 32. This counter 34 controls (1) the sample time of the binary data channels; (2) the generation of all analog telemetry carriers, through output leads 38, by means of the carrier generation logic circuit 36; (3) the shift and reset times of the three approximately mutually orthogonal signals generated by the maximal length p-n shift-register sequence generators 40, 42 and 44; and, (4) the timing of the entire sonar system. Ideally, it would be desirable to have the three signals exactly orthogonal to each other. Practically, approximate orthogonality is the best that can be obtained.

The outputs of the first and second short p-n sequence generators 40 and 42 are delayed by different amounts, thus forming two different, mutually orthogonal, codes from the outputs of the first and second modulo 2-sum circuits 50 and 52. In FIG. 5, to simplify the understanding of the drawing, the two short p-n sequence generators 40 and 42 are shown as separate, discrete, blocks, but in the next figure, FIG. 6, they are not.

The specific bit lengths or number of stages of the sequence generators 40, 42 and 44 were a matter of choice only and do not imply that other bit lengths would not also serve the purpose. To some extent, the processing gain of the telemetry system is a function of the bit length of the sequence generators 40, 42 and 44 and the bit length was chosen to give a desired processing gain.

The outputs of the p-n sequence generators 40, 42 and 44 are fed into the first, second and third modulo-2 sum circuits 50, 52 and 54, respectively, which are shown from a functional viewpoint in FIG. 5.

Input signals from a first digital data input channel 60 effectively act as a switch 50a which either permits the output signal from the first short p-n sequence generator 40 to go uninverted through the first modulo-2 sum circuit 50 to the majority logic circuit 56 or to be inverted at the input to the majority logic circuit. Similar relations hold for the outputs of the second short p-n sequence generator 42 and the long p-n sequence generator 44.

While one long p-n sequence generator 44 and two short p-n sequence generators 40 and 42 are shown in FIG. 5, the telemetry system will work with any even number of short p-n sequence generators, inasmuch as the majority logic circuit 56 will operate suitably providing that the total number of inputs to it are odd. The telemetry system would operate satisfactorily with only the long p-n sequence generator 44 and no short p-n sequence generators, however, it would then be able to only determine the time, with the data channels being missing. There is an upper limit as to the number of short p-n sequence generators which may be used, namely, the number of short p-n sequence generators cannot exceed the length in bits of the short p-n sequence generated by sequence generator 40 or 42.

The output of the majority logic circuit 56 goes into a phase modulator 58, also shown in a functional manner, together with an output from the carrier generation logic circuit 36. The phase modulator 58 is shown functionally as a switch 58a which phase-modulates by either 0° or 90° a carrier frequency coming out of the carrier generation logic circuit 36, the phase depending on the binary value of the majority logic circuit 56.

The phase-modulated output from the phase modulator 58 goes through a band-pass filter 64 before being amplified in a power amplifier 66.

Figure 6:
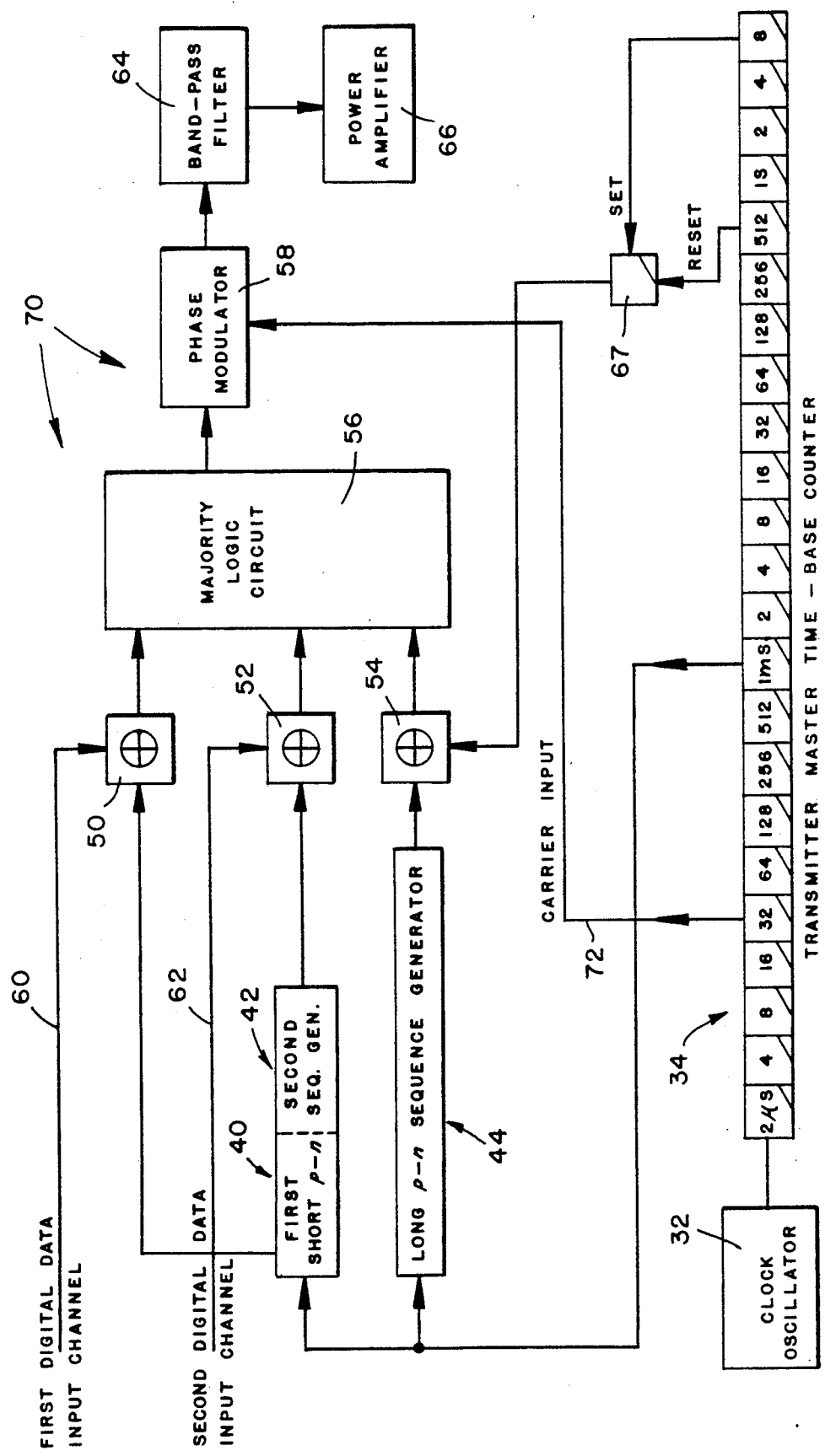
FIG. 6 is a block diagram of that part of the telemetry transmitter which shows the digital data and time encoder.

Reference is now directed to FIG. 6, which shows most of the circuits of the telemetry transmitter 30 of FIG. 5 in more detail. This figure shows a digital data and time encoder 70, one being located on the Sonaray vehicle 20 and another on the surface ship 22. The encoder on the Sonaray vehicle encodes digital information with respect to the status of the Sonaray vehicle, whereas the digital data and time encoder on the surface ship 22 encodes control information for controlling the Sonaray vehicle 20.

For simplicity in explaining the invention, it may be assumed that there is a master time base counter on both the Sonaray vehicle 20 and the surface ship 22, although in a practical embodiment only one may be used. Both are crystal-controlled and both may be set to zero time simultaneously. The difference between the time at which the signal is received at the surface ship 22 and the known time at which the time-base counter in the Sonaray vehicle 20 started to count, is equal to the transit time required to transmit the sonar signal from Sonaray vehicle 20 to the surface ship 22. When this received time signal is decoded, the actual time delay can be determined, and therefore the distance between the two vehicles.

A study of the master time-base counter 34 in FIG. 6 will show that the long 511-bit p-n sequence generator is clocked by the 1 msec counter carry, reset by the 512-millisecond carry through flip flop 67, and is negated one cycle having a duration of 512 msec for every 16-second counter carry. The "set" and "reset" switching time of flip flop 67 amounts only to a few microseconds, and, therefore, has no appreciable effect on operation of the digital data and time encoder 70. This timing control of the 511-bit sequence provides sufficient information such that the counter in the receiver can be phased to the transmitter master time counter 34, delayed by acoustic propagation time. The digital data is encoded onto the first and second short 63-bit p-n sequence generators 40 and 42 by transmitting the code straight for a binary one and negating the code for a binary zero, as was shown functionally in FIG. 5. Two 63-bit sequence generators 40 and 42 are required for the digital data channel due to its being combined with the counter phase code, generated by the long 511-bit p-n sequence generator 44, in a majority logic circuit 56. The two short generators 40 and 42 are shown in simplified form in FIG. 6, having one input and two separate outputs.

The two coded sequences which are generated by the short p-n sequence generators 40 and 42, one of which goes to the first modulo-2 sum circuit 50 and the other of which goes to the second modulo-2 sum circuit 52 are approximately orthogonal inasmuch as they are the same sequence delayed in time, by 1 bit interval in this case. When a correlation is subsequently made, in the receiver, for one of the codes, there is no contribution from the other code.

The outputs from the modulo-2-sum circuits 50, 52 and 54, which feed into the majority logic circuit 56 are approximately mutually orthogonal. The mutual orthogonality implies that the dot or inner product over one complete p-n sequence of any two of the inputs equals 0. Because the outputs are not exactly mutually orthogonal, the dot product is not exactly 0, but is, rather, equal to 1/n, where n is the length of the sequence over which the dot product is taken.

The output of the majority logic circuit 56, which may have one of two values, is equivalent to the hard-limited output of a linear sum network when the inputs have equal power, and is 90° phase-modulated onto a counter-controlled digitally generated carrier 72. A 90° phase modulation was chosen to ensure the existence of a stable carrier when modulated with a digital signal. The net effect of the phase modulation is to change the axis crossing of a rectangular or sinusoidal pulse.

All telemetry carriers, for example carrier input 72, are generated digitally under master time-base binary counter 34 control so that doppler correction performed in the digital data channels can be used for doppler correction in the analog data channels.

With respect to the function of the block labeled majority logic circuit 56 in FIG. 6, this is not the usual type of majority logic in which there are multiple inputs which are intended to be identical. In the conventional majority logic circuit, if there is an error in only one of the odd-numbered input bits, since a majority of the inputs would have the desired bit input, the output would be the correct, desired, output. Figuratively speaking, it can be said that the conventional majority logic circuit takes a "vote" with respect to its three inputs, and whichever input, a 1 or a 0, is in the majority, then that bit value becomes the output.

In the system shown in FIG. 6, it is not desired that all the inputs be identical; in fact, it is known that all three inputs are not identical. However, it is desired that the output be determined by the majority of the inputs, hence, a majority logic circuit 56 is used.

The input to the majority logic circuit 56 may have one of four different bit combinations: there may be all 0's; there may be one 1; there may be two 1's; and there may be all 1's. If, of the three inputs, at least two are 0's, the output will be a 0. If two or more of the inputs are 1's, the output is a 1. Therefore, effectively, the majority logic circuit 56 transforms input signals which may have any of four different bit combinations into output signals having only two different bit values. This is equivalent to stating that the output signal approximates, digitally, the sum of the input signals.

Figure 8:
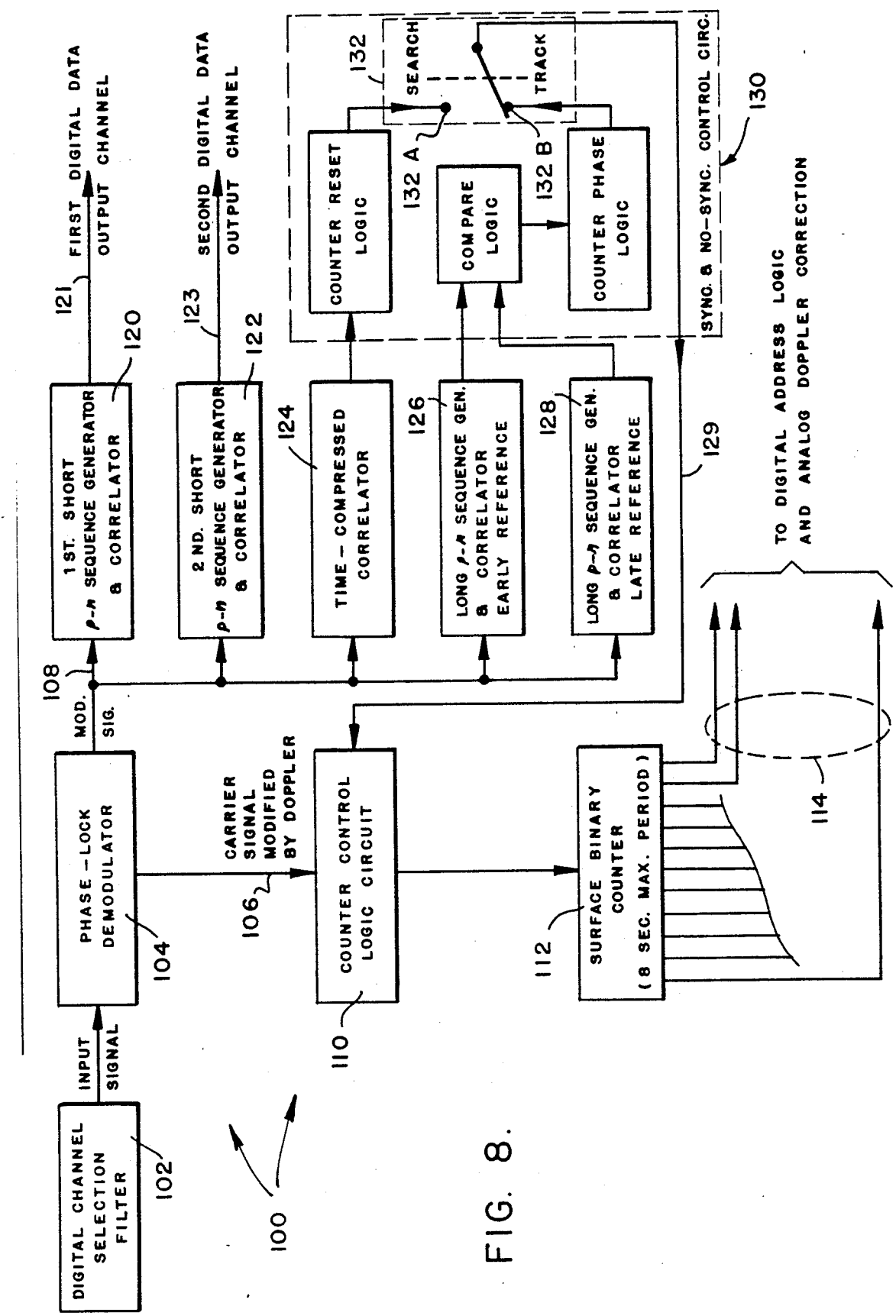
FIG. 8 is a simplified, conceptual, block diagram of the digital telemetry receiver.
Figure 9:
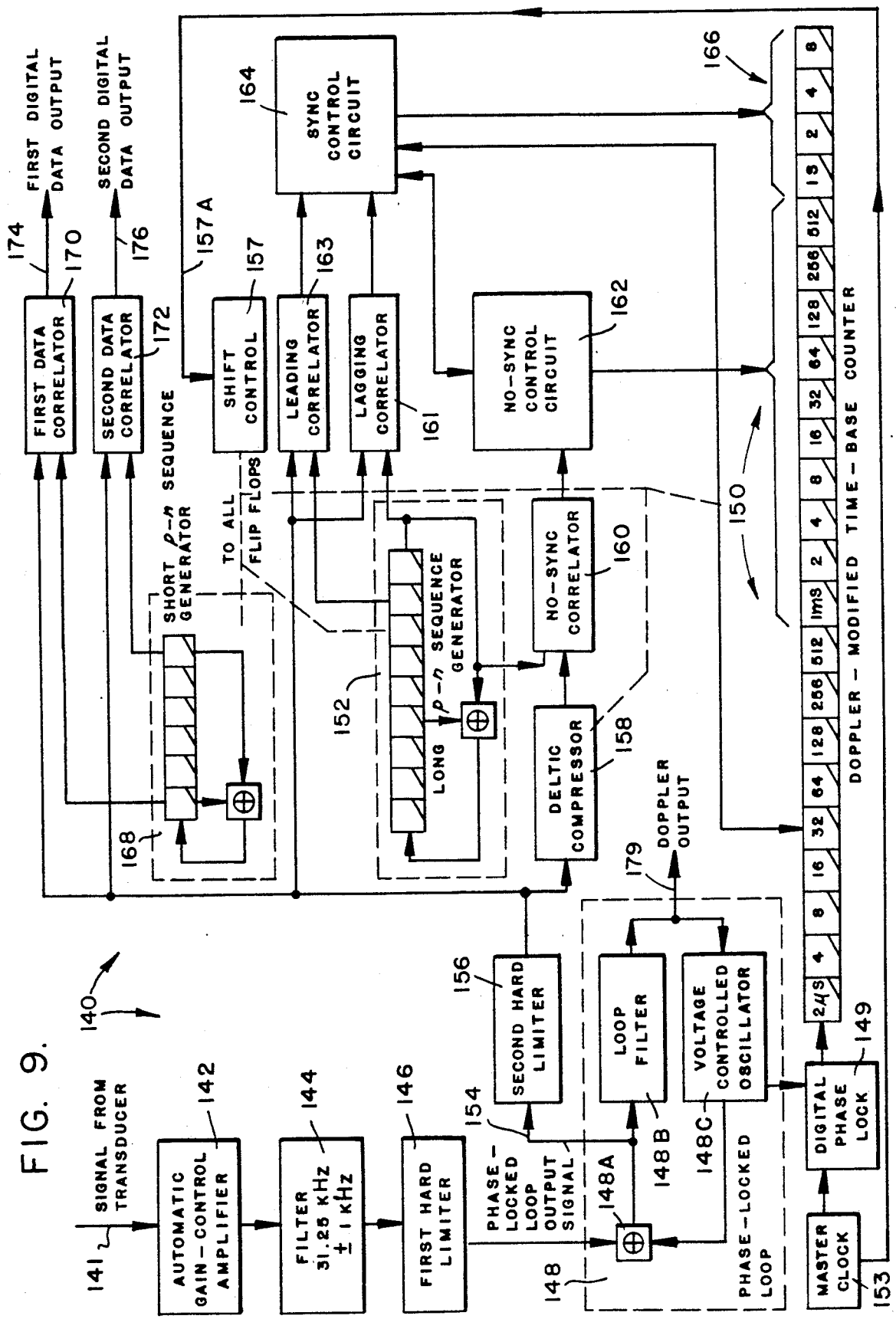
FIG. 9 is a block diagram of the digital decoder used in the telemetry system.

However, as will be explained in detail when FIGS. 8 and 9 are discussed, the complete information contained in both the first and second digital data input channels 60 and 62 may be recovered, even though there is no fixed relationship between the information flowing in the first digital data input channel 60 and the binary information flowing in the second digital data input channel 62.

Both the short p-n sequence generators 40 and 42 and the long p-n sequence generator 44 are shift registers. A 1 appearing at the input to either the short p-n sequence generator 40 or 42 or the long p-n sequence generator 44 remains a 1 for the full length of either sequence. Each stage of the shift registers 40, 42 and 44 shifts at the rate of 1 msec. Inasmuch as there are six flip flops in the short p-n sequence generator 40, 42, there is a delay of 6 msec. between the input and the output of this generator. Similarly, there is a delay of 9 msec between the input and output of the long p-n sequence generator 44.

Summarizing the description of FIG. 6, the time base counter 34 controls all functions in the Sonaray vehicle. It is used to determine the shift rate of the two different shift-register p-n sequences, the long and the short, and to create the required carrier frequencies, for example, the 31.25 kHz carrier 72. The long shift-register sequence 44, is used as a timing code. It is negated once every 16 seconds, for a duration of ½ sec. to be able to determine the phasing of the system. The two delays of the shorter p-n sequences 40 and 42 are negated according to the state of the data input lines 60 and 62, which together with the output of the long p-n sequence generator 44, connect to the three modulo 2-sum circuits 50, 52 and 54, respectively. These circuits provide inputs for the majority logic circuit 56, the output of which is phase-modulated onto the carrier 72. The phase-modulated signal is transmitted by a saturating transmitter which hard-limits the signal. The simplicity of this transmitter is important in minimizing the amount of telemetry equipment in the Sonaray vehicle 20.

Figure 7:
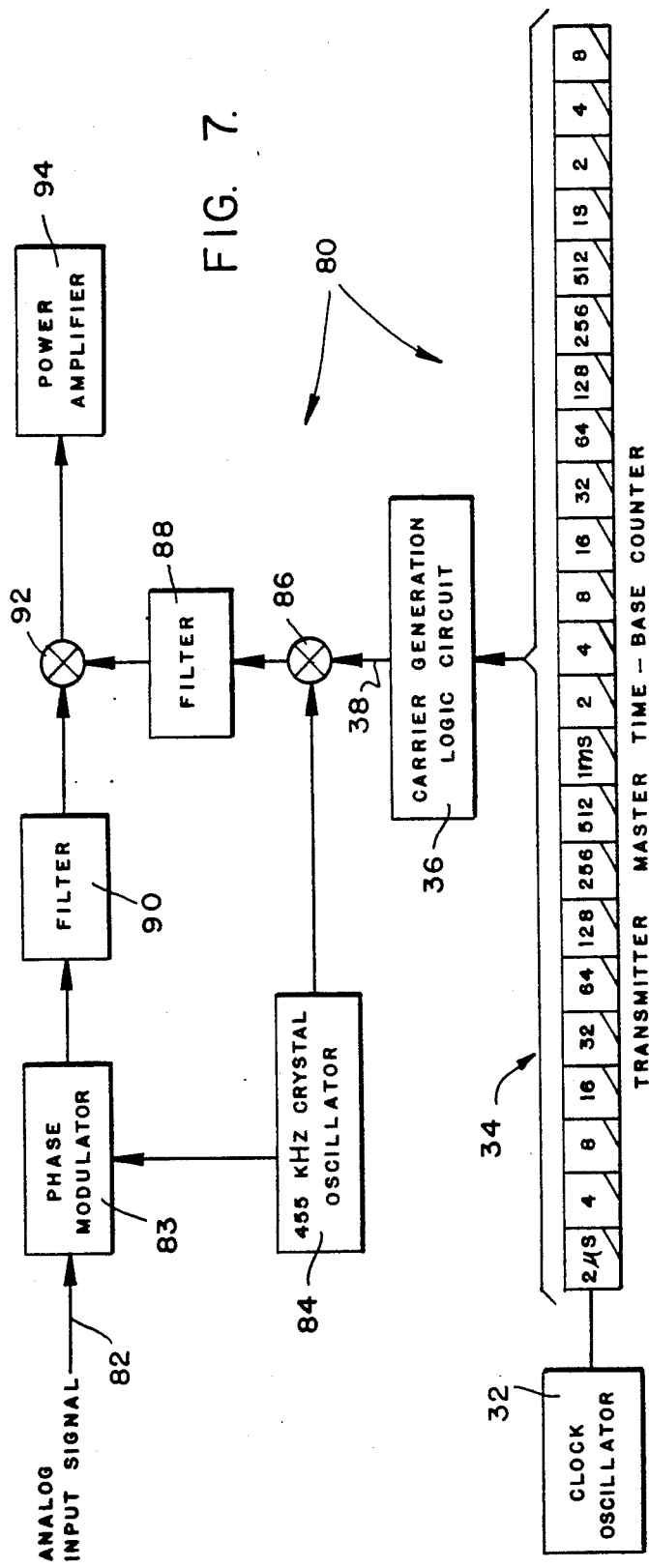
FIG. 7 is a block diagram of that part of the telemetry transmitter which shows a typical analog data modulator.

FIG. 7 is a block diagram of a typical analog data modulator 80. The master time base counter 34 is used together with the carrier generation logic circuit 36 to create, typically, a frequency for modulation by the analog input signal 82.

One function of the carrier generation logic 36 is to generate frequencies which are sum and difference frequencies of the input frequencies from the transmitter master time-base counter 34. For convenience in filtering, the phase modulation, in analog data phase modulator 83, actually takes place at a 455-kHz frequency, generated by the 455 kHz crystal oscillator 84. The first analog multiplier circuit 86 is a balanced modulator. The first modulator filter 88 is a difference frequency filter whose function it is to remove higher-order modulation products caused by the carrier generation logic circuit 36, and therefore from the master time-base counter 34, by means of lead 38.

The analog signal 82, after phase modulation, is filtered by second modulator filter 90, then shifted down in frequency to obtain phase modulation at the desired carrier frequency. The second modulator filter 90 for the phase-modulated signal is a band-pass filter whose function it is to remove higher order modulation products caused by the analog data phase modulator 83. The second analog multiplier circuit 92 is another balanced modulator, which multiplies the output signals of the first and second modulator filters 88 and 90. The shifted signal is amplified by a power amplifier 94 and transmitted. In one embodiment of the Sonaray system, there are a total of 32 similar 1-kHz analog information bandwidth channels.

FIG. 8 is a simplified block diagram of the digital telemetry receiver 100. The input signal from a digital channel selection filter 102 is separated by the phase-lock demodulator 104 into a carrier signal 106 and modulation signals 108. The received carrier signal 106, modified by doppler, is used, with a signal from the feedback loop 129 from a sync and no-sync control circuit 130 to a counter control logic circuit 110 to control the counting rate of the surface binary counter 112. The modulation signal 108 includes three transmitted shift-register sequences and is sent to five different correlators, 1st and 2nd short (63-bit) serial p-n sequence generators and correlators 120 and 122, a 511-bit time-compressed correlator 124, and the two long (511-bit) p-n sequence generators and correlators, reference numeral 126 for the early reference and 128 for the late reference.

Discussing at this time the situation when the digital telemetry receiver is not synchronized with the digital data and time encoder 70, if the digital telemetry receiver 100 is not operating in a synchronized mode, herein called a no-sync mode, a compressed-time search is made in the time compressed correlator 124. At regular intervals the degree of correlation between the receiver 100 and the encoder 70 is examined by the early reference and late reference sequence generators and correlators 126 and 128. If the degree of correlation is below a certain threshold value built into the system, a sync and no-sync control circuit 130 switches to a search mode, with a search-track switch 132 in the search position 132A.

Figure 10:
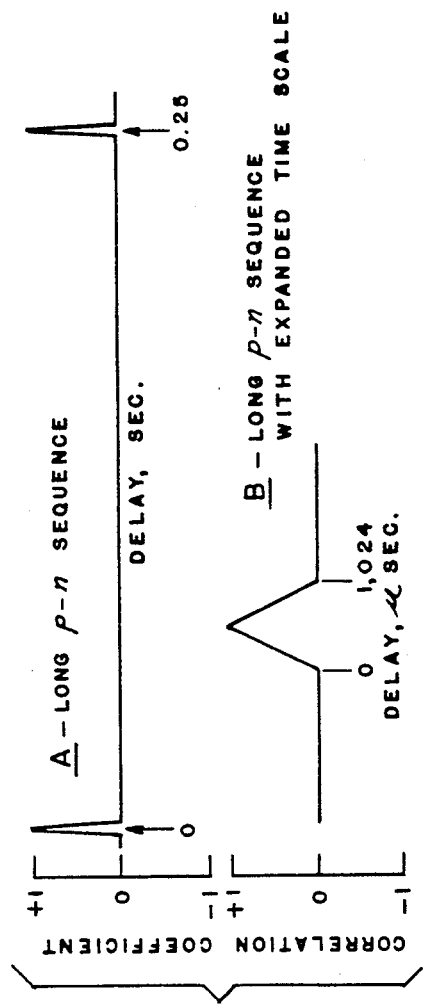
FIG. 10 is a graph showing the correlation coefficients for the long (511-bit) p-n sequences used in the digital channels.

With the system in the "search" mode, which is a time compressed mode, and with the switch arm of switch 132 at position 132A, the 511-bit time-compressed correlator 124 is used to reset the 0.5 second and lower order digits of the surface binary counter 112 on the surface ship 20 to within ±1024 microseconds of being correct. (See FIG. 10B.) In the search mode, a search is made for the correct phase until the correct phase is found, that is until a rather large correlation is found, to within 1 msec, for example. When this is accomplished, the system is transferred to the "track" or servo mode, with the switch arm of switch 132 in position 132B, as shown in FIG. 8.

The outputs of the "early" sequence generator and correlator 126 and the "late" sequence generator and correlator 128 are used to servo the phase of the 0.5 second and lower digits of the surface binary counter 112 to within ±32 microseconds of being correct (reference is directed back to flip flop 67 and its set and reset periods). The 1-second to 8-second digits of the counter 112 are phased by sensing the time of the one negated 511-bit sequence, which will occur once every 16 seconds. With the surface binary counter 112 properly phased, the output of the phase-lock demodulator 104 is sampled in the 63-bit serial p-n sequence generators and correlators 120 and 122, thereby providing the outputs 121 and 123 of the digital data channels. The counter output 114 is also used as a time base for analog data and provides control to the doppler correction logic of the analog receiving channels.

A block diagram of the decoder for digital information 140 is shown in FIG. 9. This section is central to the operation of the entire system, and requires more circuitry than the rest of the system.

At the digital decoder 140, the saturated signal is received and the high-frequency component part of it which resulted from the saturation of the transmitted signal is filtered away. Thus the received signal may be decomposed into its three components. Saturation of the signal is analogous to adding the three inputs to the majority logic circuit 56 (see FIG. 6) linearly and then hard-limiting the output.

Since the digital receiver is based upon correlation techniques, it will be helpful to first look at FIGS. 10(A) and (B), which show the correlation coefficient as a function of delay for the long p-n sequence used to determine time. FIG. 10(A) shows this correlation in time perspective. FIG. 10(B) is a time expansion that shows the correlation in the region of high correlation. If the delay between the replica and the receiver shift-register sequence is within one msec of zero, then the slope of the correlation coefficient, that is, the slope of the triangle shown in FIG. 10(B) can be used to adjust toward zero delay. Since the correlation is approximately zero for the majority of the delays, the time base of the reference in the receiver must be within 1024 $\mu$sec of the transmitted signal time base if the correlation amplitude is to be used to adjust the delay toward zero. When the time base is within this tolerance, the system is said to be "synchronized". This is the sync mode, one of two different modes of operation for the receiver section, the other mode being the "no-sync" mode.

It should be pointed out at this time that, in both the Sonaray vehicle 20 and the surface ship 22, there is a master time-base counter, which is a counter not modified by doppler, and there is also a doppler-modified time-base counter, whose frequency can either be decremented or incremented. The doppler-modified time base counter in the Sonaray vehicle 20 attempts to keep synchronized with the master time-base counter in the surface ship 22 and vice versa. The object is to set the doppler-modified time-base counter 150 on the surface ship 22 to correspond to the time on the master time-base counter 34 on the Sonaray vehicle 20 when the data which is being received on the surface ship was transmitted.

One of the primary functions of the doppler-modified time base counter 150 on the surface ship 22 is to correlate its shifting rate with that of the master time base counter 34 in the Sonaray vehicle 20. When this is done, the time difference between the two counters is known. The time difference is equal to the difference between the real time shown on the clock on the surface ship 22 and the time as determined by the doppler-modified time-base counter on the surface ship 22, the received signal at the surface ship 22 causing the time-base counter on the surface ship to be locked to the time-base counter in the Sonaray vehicle 20.

Returning now to FIG. 9 and tracing the path of the analog signal 141, which has been phase-modulated in a digital fashion, from the receiving transducer, the signal is normalized by an AGC amplifier 142 and a filter 144 that selects the region around 31.25 kHz. This signal is then hard-limited by a first hard limiter 146, and a digital data phase locked loop 148 which has the function of a demodulator applied to the 31.25-kHz carrier, which has been modified by the doppler. The phase-locked loop 148 locks onto the carrier. The replica of the 31.25-mHz signal in the Sonaray vehicle 20 is used to run a doppler-modified time-base counter 150 thru a digital phase lock 149. The digital phase lock 149 is similar in operation to a conventional phase lock, except that in this case the phase lock is associated with a more or less regular sequence of shifting pulses.

The digital phase lock 149 locks the voltage-controlled oscillator 148C to the doppler-modified time-base counter 150, using a crystal-controlled master clock 153, that is, the counter 150 is controlled by the voltage-controlled oscillator 148C but is also synchronous with the master clock 153. The doppler-modified time-base counter 150 is locked in phase by means of the digital phase lock 149, through a sample switch, not shown, but within the digital phase lock 149, controlled by the master clock 153.

Although in an embodiment actually built, the master clock output 153 was 1 MHz, it is not necessary for successful operation of the system that the flip flops shift at that rate only, but the flip flops may shift an integral number of times the 1 MHz rate.

The left-hand flip flop of counter 150 has a nominal shift rate of 2 μsec. The shift rate could be changed to 1 μsec, for example, by driving it at that rate with the clock 153, or it could be made 3 μsec by skipping a clock pulse. In this manner, the doppler-modified time-base counter 150 could be slowed down or speeded up.

In contrast to the master time base counter 34 (shown in FIG. 6) which is controlled by a crystal-controlled clock oscillator 32, the doppler-modified time base-counter 150 is not crystal-controlled, but rather is controlled by the frequency from the voltage controlled oscillator 148C of the digital data phase-locked loop 148.

The switch rates of all flip flops shown in FIG. 9 are controlled by a control gate, labelled a shift control 157. The lead 157A goes to the master clock 153. The shift control 157 controls the shift rate of all flip flops shown in FIG. 9, those in the doppler-modified time-base counter 150, those in the long and short p-n sequence generators 152 and 168 and those of the DELTIC compressor 158. As is typically the case with time compressors, the shift rate of the flip flops of the DELTIC compressor 158 is faster than the shift rate of the other flip flops, as much as 1000 times faster. The nominal shift rate of the long and short p-n sequence generators 152 and 168 is 1 msec.

The output of the modulo-2 sum circuit 148A at the input 154 to the second hard limiter 156 is a low-frequency demodulated signal, whose carrier has been removed, and whose DC component is related to the phase shift between the input signal and the signal from the voltage controlled oscillator 148C. There may be a low pass filter (not shown) between the modulo-2 sum circuit 148A and the second hard limiter 156 to reject higher order frequency components. The output of second hard limiter 156 includes the code that was phase-encoded in the input.

Information flows in a constant stream from the second hard limiter 156 into the DELTIC compressor 158 and to the first and second data correlators 170 and 172. However, these data correlators cannot decode any meaningful information into the first and second digital data outputs 174 and 176 unless the decoder for digital information 140 is in sync. Once the decoder 140 is in sync, the information flowing into the DELTIC compressor 158 from the second hard limiter 156 is ignored. Referring back to FIG. 8, it is known that the digital telemetry receiver 100 is not receiving useful information when the search-track switch 132 is in the search position 132A. The search-track switch 132 is not merely a simple switch, but includes rather sophisticated circuitry.

Discussing now the manner in which useful data may be decoded by the use of correlation techniques, as an example, if the time code generated by long p-n sequence generator 152 is multiplied with the received signal, which is the sum of the transmitter time code and the two signals from the first and second digital data input channels 60 and 62 (see FIG. 6), then the correlation from the data codes will be 0 because they are orthogonal to each other, but the correlation due to the time code will be a maximum. This permits separation of the time code from the two data codes. In a similar manner, the information contained in either one of the digital data input channels 60 or 62 may be separated from the information in the other digital data input channel.

It might be pointed out, that, in a sense, correlation is equivalent to taking the inner product. The inner product of one of the generated short p-n sequences, say, that to first data correlator 170, is taken against the received signal 141. Because of the near-complete orthogonality of any two of the three inputs to majority logic circuit 56 (see FIG. 6), the contribution to this same inner product of the data corresponding to the data from the second digital data input channel 62 in FIG. 6 as well as the contribution of the timing information from the long p-n sequence generator 44, is equal to 0. In this way, the digital data in either data channel or the timing code may be obtained.

In the digital decoder 140, use is made of the fact that, in the digital data and time encoder 70 (see FIG. 6) any pair of inputs to the majority logic circuit 56 are approximately, but closely, mutually orthogonal. The fact that any two of the inputs are orthogonal is information which is contained in the output of the majority logic circuit 56. Therefore, even though the inputs to the majority logic circuit 56 may be one of four distinct bit combinations and the output is only one of two bits, that is, a 0 or a 1, the original of the four bit combinations can be obtained in the digital decoder 140.

This is so because, as can be seen from FIG. 6, each of the digital data inputs in channels 60 and 62 is added in its respective modulo-2 sum circuit 50 and 52 with an output from short p-n sequence generator 40, 42 which is at a different time delay for each of the data inputs. Therefore, in FIG. 9, the outputs 174 and 176 of first and second data correlators 170 and 172, respectively, will correlate, or be maximum, at different times which correspond to the same time delay that is shown in FIG. 6.

If the phase-locked loop does not gain or lose a carrier cycle, the doppler-modified time base counter 150 on the surface ship 22 remains exactly in phase with the master time base counter 34 in the Sonaray vehicle 20. However, to determine the appropriate state of the higher-numbered flip-flop circuits of the doppler-modified time base counter 150, the long p-n sequence generated by the long p-n sequence generator 152 must be examined.

Discussing now in more detail the no-sync mode of operation of the sync control circuit 164, the phase-locked loop modulation output signal 154 is hard-limited in second hard limiter 156, and is time-compressed by a DELTIC compressor 158 for correlation in the no-sync correlator 160 against the long-term p-n sequence from generator 152.

Samples are taken at a delay separated by 1,024 microseconds in real time. In 512 microseconds of compressed time, a correlation is made which would spread over 0.5 second of real time. A section of the doppler-modified time-base counter 150, as indicated in FIG. 9, is set by the no-sync control circuit 162 according to the delay at which maximum correlation was found. As soon as this has been done, the sync control circuit 164 takes over.

In the time that it takes lagging and leading correlators 161 and 163 to make one correlation, the DELTIC compressor can search for all possible phases and can determine the minimal phase difference to, say, within 1 msec of real time. The lagging and leading correlators 161 and 163 thereupon refine the error to within 32 μsec. The DELTIC compressor 158 determines the proper phasing or timing to a time within the uncertainty of the lagging and leading correlators 161 and 163.

It will be observed that, although data cannot be decoded until sync is established, the output of the second hard limiter 156 feeds the DELTIC compressor 158 and the four correlators 161, 163, 170 and 172 at all times.

When the digital decoder 140 is in the no-sync mode, each possible delay with the long p-n sequence is examined, and whichever of the possible delays has the maximum correlation, then the time base counter 150 is set to correspond with that maximum correlation. The system then reverts back to the sync mode. The digital decoder 140 stays in the sync mode until the sum of the last 16 correlations falls below the predetermined threshold level.

When the decoder for digital information 140 is in sync, the information coming out of the phase-locked loop 148 is examined, by determining whether the correlation is coming out of the lagging correlator 161 or out of the leading correlator 163, and this determines whether the shift control 157 slows down or speeds up.

In the sync mode, it is assumed that the reference is within 1,024 microseconds of the time of maximum correlation. The system then operates in a non-time-compressed mode. The operation here is a correlation at two delays separated by 1,024 microseconds (refer to FIG. 10). The sync control circuit 164 will modify the time base by 32 microseconds any time it finds that one of these correlations from lagging correlator 161 or leading correlator 163 is larger than the other. It will advance the time base by 32 microseconds if the trailing or lagging correlation is larger than the leading correlation, and will delay it by 32 microseconds if the advance or leading correlation is larger than the lagging correlation. Thus the time base is adjusted to within 32 microseconds of the time base indicated by the received signal. Any cycles added or subtracted by the phase-locked loop 148 will be corrected by this operation. The doppler-modified time-base counter 150 is now set to correspond to the 0.512-second time base in the Sonaray vehicle. However, the requirement is that the time base be modified without ambiguity to 16 seconds. In order to do this, the sync-control circuit 164 checks for the negated 0.512-second p-n sequence, which will occur once every 16 seconds, (note flip flop 67 in FIG. 6) and sets the higher-numbered flip-flops 166 of the time base according to the time at which it receives the negated p-n sequence. This sets up the entire time-base counter system to correspond to within 32 microseconds to the transmitter master time-base counter 34 in the Sonaray vehicle 20.

The sync control circuit 164 monitors the average of the last 16 correlations between lagging correlator 161 and leading correlator 163. If the sum of the correlations of the outputs of correlators 161 and 163 is above a predetermined threshold level set into the equipment, the system is kept in the sync mode.

The sync control circuit 164 also determines when the system has lost synchronization. It does so by examining the average of the last 16 correlations received. If this average falls below a threshold preset into the equipment, the system is no longer synchronized and the no-sync control circuit 162 takes over once again.

In the sync mode, the data are given by the correlation of the short p-n sequence at two delays generated by the short p-n sequence generator 168, as shown at the top of FIG. 9. This results in two data outputs 174 and 176 corresponding to the two inputs 60 and 62 in the digital data and time encoder 70, shown in FIG. 6.

The doppler output 179 is available to be read out or otherwise used if required.

Discussing now the function of the correlators in more detail, perhaps in unnecessarily great detail, but this part of the operation is very complex, each of the correlators 160, 161, 163, 170 and 172 shown in FIG. 9 goes through a whole p-n sequence and, in effect, counts agreements of 1's and 0's between the binary numbers making up its two inputs. If each of the two inputs are alike, the correlator adds a count.

In the sync mode, the top correlator 170 compares the hard-limited analog signal from the hard limiter 156 and compares agreements, of the 1's against the 1's and the 0's against the 0's, with the output of the short p-n sequence generator 168. Every time that the two inputs to correlator 168 agree, whether they are both 1's or 0's, the correlator makes a count of the agreement. Every time that the two inputs to this correlator do not agree the correlator does not count the lack of agreement. This is true for each of the five correlators shown in FIG. 9.

Long p-n sequence generator 152 and the short p-n sequence generator 168 are in actuality reference generators, inasmuch as they are generating the same p-n sequences as are generated by corresponding sequence generators in the digital data and time encoder 70. They are the references against which the cross-correlation is made.

The sync control circuit 164 determines when the digital decoder 140 has lost synchronization. It does so by examining the sum of the last 16 correlations received. If this sum falls below a threshold value preset into the equipment, the system reverts to the no-sync mode.

Connected to the sync control circuit 164 are two correlators, lagging correlator 161 and leading correlator 163, whose outputs form the inputs to the sync control circuit. One of the inputs to both correlators 161 and 163 is the hard-limited output from the phase-locked loop 148, while the other input to lagging correlator 161 is an output of the long p-n sequence generator 152, and the other input to leading correlator 163 is an earlier output from the long p-n sequence generator. Each correlator 161 and 163 counts agreements between its two inputs and feeds the binary number corresponding to the number of agreements into the sync control circuit 164. As stated above, agreements are counted for one complete cycle (511 bits) of the p-n sequence generator 152. Depending upon the output of the correlators 161 and 163, the sync control circuit 164 modifies the frequency of the doppler-modified time base counter 150. If the number of agreements is less than a certain threshold number, the sync control circuit 164 decrements the time base frequency of the doppler-modified time base counter 150, whereas if the number of agreements is above a certain number, the sync control circuit increments the time base frequency.

In the sync mode, depending upon whether the lagging correlation or the leading correlation is the larger, either an extra count is added to flip-flop 150a or a count is deleted from this flip-flop. The logic circuitry involved in deleting or adding a count is not shown in FIG. 9.

It might also be pointed out that random code fed into either lagging correlator 161 or leading correlator 163 would count agreements half of the time. Therefore, positive correlation implies agreements more than one-half of the time and negative correlation implies agreements less than one-half of the time.

Discussing now the effect of noise on the output of a correlator, a correlator, or a matched filter, which are mathematically equivalent, are devices which, optimally, in the presence of a certain type of noise, such as gaussian noise, improve the signal to noise ratio (SNR) as well as any other type of devices. This can be proved mathematically.

Given a long code, for example a time code, which is correlated with another code, it will be capable of a certain maximum correlation in the absence of noise. In the presence of noise, the output of the correlator will be equal to the sum of this same correlation value added to a certain quantity contributed by the noise. The noise coming into the correlator is equal to the noise coming out, but it does not cancel out. Nevertheless, the signal-to-noise ratio at the output of a correlator is improved over the SNR at its input, by the time-bandwidth product of the code.

Figure 11:
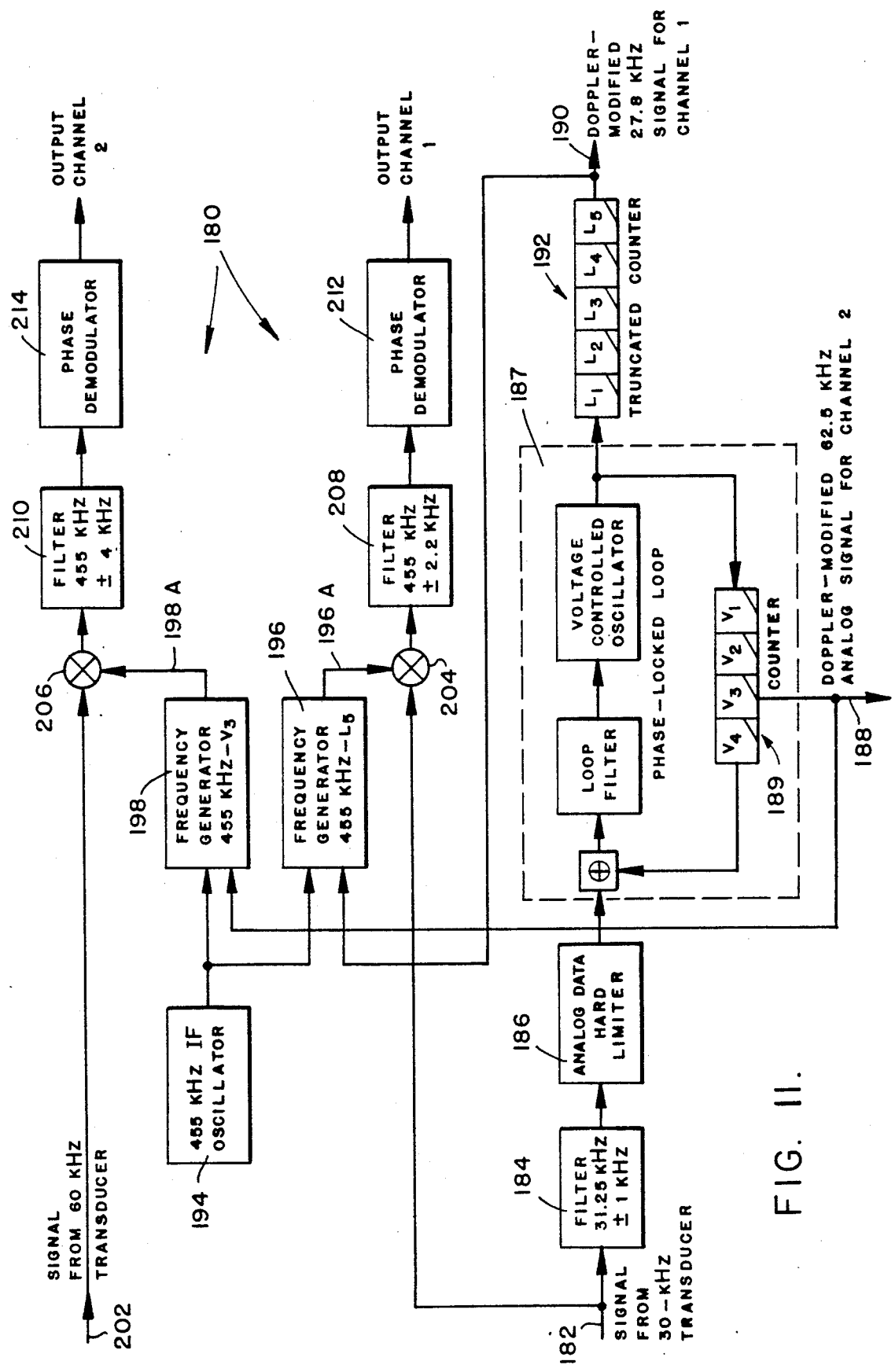
FIG. 11 is a block diagram of the demodulator for analog data.

Referring now to FIG. 11, the section of the receiver that demodulates the analog signals, that is, the demodulator for analog data 180, also uses a phase-locked loop, analog data phase-locked loop 187.

A signal 182 from a 30-kHz transducer is filtered in a 31.25±1 kHz modulated carrier filter 184, hard-limited in analog data hard limiter 186, and enters the analog data phase-locked loop 187.

The signal from the analog data hard limiter 186 going into the phase-locked loop 187 is a modulated carrier signal centered about 30 kHz. After processing in the phase-locked loop 187, its frequency is shifted, as is done in most phase-lock loops. Essentially, a phase-lock loop matches the frequency of the oscillator within it to an incoming carrier frequency.

It should be noted that the signal 182 which contains analog information is centered at the same frequency as signal 141 in FIG. 9, which contained digital information. The reason for this is, that in an embodiment actually built, the 30 kHz channel was broad enough to handle both analog and digital data, while the 60 kHz channel was broad enough to handle the digital data only.

The truncated L counter 192 and the V counter 189, not truncated, both counters being associated with the phase-locked loop 187, generate the doppler-modified replica frequencies 188 and 190, are subtracted from a 455 kHz signal generated by the 455 kHz intermediate frequency oscillator 194, to result in frequencies of (455 kHz-$L_5$), designated 196A, and (455 kHz-$V_3$), designated 198A, generated by frequency generators 196 and 198, respectively. The output signals 196A and 198A are then multiplied together in first and second analog data multiplier circuits 204 and 206, respectively, with the analog signals 182 and 202 from the 30-kHz and 60-kHz transducers, respectively. The multiplied signals are then filtered in appropriately centered first and second analog data filters 208 and 210 and finally demodulated in phase demodulators 212 and 214.

It will be noted that the signal 202 from the 60-kHz transducer does not feed directly into the phase-locked loop 187 as does the signal 182 from the 30-kHz transducer. This is so, because, once the phase-locked loop 187 has corrected one channel, channel 1, 190, in this case, for doppler, it has corrected all channels for doppler, since generally doppler affects all channels in the same way. In other words, since all channels were phase-coherent before doppler effects took place, they should again be phase-coherent after any one channel is corrected for doppler.

The acoustic underwater telemetry system herein described is able to correct for the doppler of acoustic signals and to compensate for the variation of attenuation as a function of frequency and range. The analog phase-modulated system is capable of operating out to 2,000 yards horizontal range with an output signal-to-noise ratio of at least 10 db. Thirty-two analog signal channels require a total power of 9 watts total transmitted omnidirectionally, and use the frequency region from 32 to 102 kHz.

The telemetry system herein described might also be used in other applications. For example, by improving communications between a submarine and a surface ship, a more effective use of the vessels could be realized. The submarine's detection capabilities could be effectively coupled to the fire power of the surface ship by the automatic telemetry of plot information. This could be accomplished with frequencies that would be attenuated to below-sea-noise at ranges slightly greater than the telemetry range. If longer ranges were required than would be permitted by refraction, a sonobuoy-like device released from the submarine could be used.

Recovery systems and deep-submergence oceanographic research vehicles have requirements for communication and tracking that are similar to those of the Sonaray system.

Another application is in the testing of negatively buoyant ordnance, such as depth bombs. By transmitting the required data to the surface, the recovery problem could be avoided or reduced, since the data are often far more valuable than the vehicle.

Obviously many modifications and variations of the present invention are possible in the light of the above teachings. It is therefore to be understood that within the scope of the appended claims the invention may be practiced otherwise than as specifically described.

What is claimed is:

1. A transmitter for a transmitter-receiver telemetry system comprising:
a clock oscillator for generating the fundamental frequency used in the telemetry system;
a transmitter master time-base counter, whose input is connected to the output of the clock oscillator, for generating at least one output carrier frequency;
first and second maximal length short pseudo-noise (p-n) sequence generators, consisting of serially-connected flip flops, whose shift rates are controlled by the transmitter master time-base counter, and having outputs which are mutually orthogonal;

first and second modulo-2 sum circuits, one of each of whose two inputs is connected to the output of the first and second short p-n sequence generators respectively;

first and second digital data input channels, forming the second inputs to the first and second modulo-2 sum circuits, respectively;

a long pseudo-noise (p-n) sequence generator, consisting of serially-connected flip flops, whose shift rate is controlled by the transmitter master time base counter, and having an output which is mutually orthogonal to the outputs of the first and second maximal length short pseudo-noise sequence generators;

a third modulo-2 sum circuit, one of whose inputs is the output signal from the long p-n sequence generator and the other of whose inputs is a timing sequence controlled by the transmitter master time base counter;

a majority logic circuit whose inputs comprise the outputs of the first, second and third modulo-2 sum circuits;

a digital data modulator, for modulating a carrier signal generated by the transmitter master time-base counter with the output signal from the majority logic circuit; and a power amplifier for amplifying the output signal of the digital data modulator.

2. A transmitter according to claim 1, wherein, the clock oscillator is a crystal-controlled oscillator.

3. A transmitter according to claim 2, wherein, the first and second maximal length short pseudo-noise sequence generators comprise one sequence generator having two outputs, one of which is delayed with respect to the other.

4. A transmitter according to claim 3, wherein, the transmitter master time base counter consists of a set of flip flops serially connected in such a manner that the output frequency of each flip flop is one-half the frequency at its input.

5. A transmitter according to claim 3, wherein, the digital data modulator is a phase modulator.

6. A transmitter according to claim 5, wherein, the phase modulator modulates at two phases.

7. A transmitter according to claim 4, further comprising:
a carrier generation logic circuit connected to the transmitter master time base counter for generating frequencies which are sum and difference frequencies of the input frequencies from the transmitter master time base counter.

8. A transmitter according to claim 7, wherein, the timing sequence controlled by the master time base counter, which forms one of the inputs to the third modulo-2 sum circuit, is generated by a flip flop having predetermined set and reset periods.

9. A transmitter according to claim 8, further comprising:
a crystal oscillator; and
an analog modulator, for modulating an analog input signal upon the output signal of the crystal oscillator.

10. A transmitter according to claim 9, wherein, the analog data modulator is a phase modulator.

11. A transmitter according to claim 10, further comprising:
a first analog multiplier circuit, which multiplies a signal from the carrier generation logic with a signal from the crystal oscillator;
a first modulator filter whose input is the output of the first analog multiplier circuit;
a second modulator filter, whose input is the output of the analog data phase modulator; and
a second analog multiplier circuit which multiplies the outputs of the first and second modulator filters.

12. A receiver for a transmitter-receiver telemetry system according to claim 11, comprising:
a first hard-limiter for hard-limiting a phase-modulated signal, which may be doppler-modified;
a digital data phase-locked loop, including a voltage-controlled oscillator and a modulo-2 sum circuit, connected to the output of the first hard limiter, for demodulating the phase-modulated signal;
a crystal-controlled master clock;
a digital phase lock, one of whose inputs is connected to the voltage-controlled oscillator and the other of whose inputs is connected to the output of the master clock;
a doppler-modified time-base counter, whose shift rate is controlled by the digital phase lock, and consisting of serially-connected flip flops, each flip flop having an output frequency equal to one-half of its input frequency;
a second hard-limiter, connected to the output of the modulo-2 sum circuit of the digital data phase-locked loop, which hard-limits the demodulated signal;
circuitry connected to the output of the second hard limiter and to the doppler-modified time-base counter, for operation in a no-sync mode until the frequencies generated by the doppler-modified time-base counter are synchronized within a desired range of the frequencies generated by the transmitter master time-base counter;
circuitry connected to the output of the second hard limiter and to the doppler-modified time-base counter, for operation in a sync mode as long as the frequencies generated by the doppler-modified time-base counter are synchronized within the desired range of the frequencies generated by the transmitter master time base counter; and
means for connecting the output of the second hard limiter to the circuitry for operation in the sync mode as long as there is at least a predetermined amount of synchronization between the doppler-modified time-base counter and the transmitter master time-base counter and for connecting to the circuitry for operation in the no-sync mode when there is no longer the predetermined amount of synchronization.

13. A receiver according to claim 12, wherein the circuitry for sync mode operation comprises:
a decoder long p-n sequence generator, synchronized with and having the same number of flip flops as the transmitter long p-n sequence generator;
a lagging correlator, one input of which is connected to the output of the second hard limiter and the other input of which is connected to the output flip flop of the decoder long p-n sequence generator;
a leading correlator, one input of which is connected to the output of the second hard limiter and the other input of which is connected to another flip flop of the decoder long p-n sequence generator; and a sync control circuit having as two inputs the output signals from the lagging and leading correlators for incrementing or decrementing the frequencies of the doppler-modified time-base counter to thereby bring it into closer synchronization with the master time-base counter in the transmitter.

14. A receiver according to claim 13, wherein the other flip flop is the one adjacent to the output flip flop.

15. A receiver according to claim 14, wherein the circuitry for no-sync mode operation comprises:

a DELTIC compressor connected to the output of the second hard limiter, for compressing the information in the received signal;

a no-sync correlator, one of whose inputs is the output from the DELTIC compressor and the other of whose inputs is the output from the output flip flop of the receiver long p-n sequence generator, for determining the correlation between the two input signals to the no-sync correlator;

a no-sync control circuit for monitoring the no-sync correlator output, and, incrementing or decrementing the doppler-modified time-base counter as a function of the degree of correlation in the two inputs to the no-sync correlator, to result in optimal synchronization between the doppler-modified time base counter and the receiver master time base counter, whereupon the receiver is caused to operate in the sync mode.

16. A receiver according to claim 15, further comprising:

a decoder short p-n sequence generator, having the same number of stages as, the same shift rate as, and synchronized with, the transmitter short p-n sequence generator;

a first data correlator, for determining the first digital data having as one input the output from the second hard limiter and as the other input the output from the first stage of the receiver short p-n sequence generator; and a second data correlator, for determining the second digital data, having as one input the output from the second hard limiter and as the other input the output from the last stage of the receiver short p-n sequence generator.

17. A receiver according to claim 16, further comprising:

a modulated carrier filter, for filtering a phase-modulated analog input signal;

an analog data hard limiter for hard-limiting the filtered analog signal;

an analog data phase-locked loop, including a voltage controlled oscillator, whose input is the hard-limited phase-modulated signal and whose output is a phase-modulated carrier signal from the voltage-controlled oscillator;

a truncated counter whose input signal is the output signal from the voltage controlled oscillator of the analog data phase-locked loop and whose output signal is a doppler-modified signal shifted in frequency with respect to its input signal;

an oscillator for generating an intermediate frequency below the carrier frequency of the phase-modulated analog input signal;

a frequency generator which generates a frequency equal to the difference between the frequency generated by the intermediate frequency oscillator and the output frequency of the truncated counter;

a first analog data multiplier circuit, one of whose inputs is the phase-modulated analog input signal and the other of whose inputs is the output signal of the truncated counter;

a first analog data filter whose input signal is the output signal of the first analog data multiplier circuit; and a first analog data phase demodulator whose input is connected to the output of the first analog data filter.

18. A receiver according to claim 17, further comprising:

an untruncated counter, located within the phase-locked loop whose input signal is the output signal of the voltage-controlled oscillator of the analog data phase-locked loop;

a frequency generator which generates a frequency equal to the difference between the frequency generated by the intermediate frequency oscillator and an output frequency of the untruncated counter;

a second analog data filter whose input signal is the output signal of the second analog data multiplier circuit; and a second analog phase demodulator whose input is connected to the output of the second analog data filter.

19. A transmitter-receiver telemetry system,
the transmitter including:

a clock oscillator for generating the fundamental frequency used in the telemetry system;

a transmitter master time-base counter, whose input is connected to the output of the clock oscillator, for generating at least one output carrier frequency;

first and second maximal length short pseudo-noise (p-n) sequence generators, consisting of serially-connected flip flops, whose shift rates are controlled by the transmitter master time base counter, and having outputs which are mutually orthogonal;

first and second modulo-2 sum circuits, one of each of whose two inputs is connected to the output of the first and second short p-n sequence generators respectively;

first and second digital data input channels, forming the second inputs to the first and second modulo-2 sum circuits, respectively;

a long pseudo-noise (p-n) sequence generator, consisting of serially-connected flip flops, whose shift rate is controlled by the transmitter master time-base counter, and having an output which is mutually orthogonal to the outputs of the first and second maximal length short pseudo-noise sequence generators;

a third modulo-2 sum circuit, one of whose inputs is the output signal from the long p-n sequence generator and the other of whose inputs is a timing sequence controlled by the transmitter master time base counter;

a majority logic circuit whose inputs comprise the outputs of the first, second and third modulo-2 sum circuits;

a digital data modulator, for modulating a carrier signal generated by the transmitter master time-base counter with the output signal from the majority logic circuit;

a power amplifier for amplifying the output signal of the digital data modulator;

the receiver including:

a first hard-limiter for hard-limiting a phase-modulated signal, which may be doppler-modified;

a digital data phase-locked loop, including a voltage-controlled oscillator and a modulo-2 sum circuit, connected to the output of the first hard limiter, for demodulating the phase-modulated signal;

a crystal-controlled master clock;

a digital phase lock, one of whose inputs is connected to the voltage-controlled oscillator and the other of whose inputs is connected to the output of the master clock;

a doppler-modified time-base counter, whose shift rate is controlled by the digital phase lock, and consisting of serially-connected flip flops, each flip flop having an output frequency equal to one-half of its input frequency;

a second hard-limiter, connected to the output of the modulo-2 sum circuit of the digital data phase locked loop, which hard-limits the demodulated signal;

circuitry connected to the output of the second hard limiter and to the doppler-modified time-base counter for operation in a no-sync mode until the frequencies generated by the doppler-modified time-base counter are synchronized within a desired range of the frequencies generated by the receiver master time-base counter;

circuitry connected to the output of the second hard limiter and to the doppler-modified time-base counter for operation in a sync mode as long as the frequencies generated by the doppler-modified time-base counter are synchronized within the desired range of the frequencies generated by the receiver master time base counter; and means for connecting the output of the second hard limiter to the circuitry for operation in the sync mode as long as there is at least a predetermined amount of synchronization between the doppler-modified time-base counter and the transmitter master time-base counter and for connecting to the circuitry for operation in the no-sync mode when there is no longer the predetermined amount of synchronization.

* * * * *